United States Patent [19]

Chang

[11] Patent Number: 4,515,933

[45] Date of Patent: * May 7, 1985

[54] ONE-COMPONENT POLYURETHANE ADHESIVE COMPOSITIONS

[75] Inventor: Eugene Y. C. Chang, Bridgewater, N.J.

[73] Assignee: American Cyanamid Company, Stamford, Conn.

[ * ] Notice: The portion of the term of this patent subsequent to May 7, 2002 has been disclaimed.

[21] Appl. No.: 483,984

[22] Filed: Apr. 11, 1983

[51] Int. Cl.$^3$ .................... C08G 18/10; C08G 18/22
[52] U.S. Cl. ........................ 528/57; 528/76; 528/85; 528/81; 528/56; 528/54; 156/307.3; 156/331.4; 524/339; 524/394; 524/398
[58] Field of Search ............ 528/76, 85, 81, 57, 528/56, 54; 156/307.3, 331.4; 524/339, 394, 398

[56] References Cited

U.S. PATENT DOCUMENTS

| | | | |
|---|---|---|---|
| 3,810,851 | 5/1974 | Norman et al. | 521/88 |
| 4,151,345 | 4/1979 | Hillegass | 528/56 |
| 4,390,678 | 6/1983 | LaBelle et al. | 156/331.4 |

*Primary Examiner*—John Kight
*Assistant Examiner*—Marvin L. Moore
*Attorney, Agent, or Firm*—Steven J. Hultquist; Gordon L. Hart

[57] ABSTRACT

A heat-curable polyurethane composition, comprising:
(a) a secondary or tertiary aliphatic diisocyanate prepolymer;
(b) a polyol compound;
(c) a chain extender selected from the group consisting of sucrose and sorbitol; and
(d) a curingly effective amount of a catalyst selected from the group consisting of magnesium acetylacetonate, nickel acetylacetonate, magnesium stearate, cadmium stearate, and organic acid salts of 1,8-diazabicyclo [5.4.0]undec-7-ene.

18 Claims, No Drawings

ONE-COMPONENT POLYURETHANE ADHESIVE COMPOSITIONS

BACKGROUND OF THE INVENTION

This invention generally relates to one-component, i.e., single package, polyurethane adhesive compositions which are heat-curable. More particularly, it relates to catalyzed one-component polyurethane adhesive compositions which are heat-curable and storage stable.

DESCRIPTION OF THE PRIOR ART

Polyurethane adhesives are widely used for bonding various metallic, plastic and glass substrates because of their good bonding strength and versatility. Two-component polyurethane adhesive systems in which an isocyanate and a hydroxyl compound, e.g., a diisocyanate and polyol, are mixed shortly before use, are particularly well-known in the art. However, in such an application the two components have to be properly measured and thoroughly mixed shortly before use because the isocyanate and hydroxyl compound components react to form a gel after standing at ambient temperatures for relatively short periods of time, on the order of several minutes to several hours.

Numerous types of compounds, such as tertiary amines, organotin compounds, and various metal complexes have been disclosed as effective curing catalysts for polyurethane adhesives. However, most catalysts catalyze the reaction of the hydroxyl compound with the isocyanate not only at elevated temperatures, but also at ambient (room) temperatures.

There is a need, therefore, for catalyzed one-component polyurethane adhesive systems that are stable at room temperature for extended periods of time, on the order of at least one month and provide good bonding strength on curing at elevated temperature by the application of heat.

DESCRIPTION OF THE INVENTION

The present invention relates to a one-component, heat-curable polyurethane composition suitable for use as an adhesive or bonding medium, comprising: (a) a secondary or tertiary aliphatic diisocyanate prepolymer; (b) a polyol compound; (c) a chain extender selected from the group consisting of sucrose and sorbitol; and (d) a curingly effective amount of a catalyst selected from the group consisting of magnesium acetylacetonate, nickel acetylacetonate, magnesium stearate, cadmium stearate, and organic acid salts of 1,8-diazabicyclo[5.4.0]undec-7-ene.

The invention also relates in another aspect to a process for bonding substrate workpieces with a polyurethane adhesive comprising applying a wet film of the above-described polyurethane composition interposed between and in contact with the substrate workpieces, and curing same at elevated temperature to form a solid polyurethane film adhesively bonding the substrate workpieces to one another.

In yet another aspect, the invention relates to an article comprising an assembly of substrate workpieces adhesively bonded to one another by a cured film of the above-described heat-curable polyurethane composition.

As used herein, "polyol compound" means a polyol or mixture of polyols, which is capable of reaction with the secondary or tertiary aliphatic diisocyanate prepolymer, at elevated temperatures and in the presence of the catalyst of the present invention, to form polyurethane as a reaction product.

The term "secondary or tertiary aliphatic diisocyanate prepolymer" as used herein is intended to be broadly construed to encompass aliphatic diisocyanate prepolymers containing at least one secondary or tertiary isocyanate group, and having an isocyanate content of from about 5% to about 30% by weight, based on the weight of the prepolymer, formed as reaction products of a polyol compound, e.g., hydroxyl-terminated polyesters or polyethers, and an aliphatic diisocyanate compound containing at least one secondary or tertiary isocyanate group.

As used herein, "heat-curable polyurethane composition" and "polyurethane composition" refer to diisocyanate prepolymer/polyol compound/chain extender/catalyst compositions which are curable at elevated temperature to yield polyurethanes.

The polyurethane compositions of the present invention are stable for extended periods on the order of at least one month and thus suitably may be utilized in the form of a "one-component" system as a single package mixture of the diisocyanate prepolymer/polyol compound/chain extender/catalyst constituents. Upon application, wet films of the instant polyurethane composition may be cured rapidly on heating to form cured polymeric films characterized by good bonding strength.

The one-component polyurethane composition of this invention offers the following advantages relative to the two-component systems of the prior art:

(1) it avoids the requirements of the prior art two-components systems of accurately measuring and mixing the prepolymer, chain extender and polyol compound reactants, and catalyst, immediately prior to application and curing.

(2) The cure time of the catalyzed composition of the present invention at elevated temperature is substantially reduced, as compared to corresponding uncatalyzed compositions, thus saving time and energy (heat input) in the curing step.

(3) The composition of the present invention has excellent storage stability.

The one-component adhesive polyurethane composition of the present invention suitably may be prepared as follows.

A secondary or tertiary aliphatic diisocyanate prepolymer having an isocyanate content of from about 5% to about 30% by weight, based on the weight of the prepolymer, first may be prepared by reaction of a polyol compound such as a hydroxyl-terminated polyester or polyether with a stoichiometric excess of a suitable secondary or tertiary aliphatic diisocyanate compound. The hydroxy-terminated polyester or polyether polyol compound preferably is utilized in anhydrous form and preferably has an equivalent weight of from about 100 to about 2000, and most preferably from about 100 to about 1000. As used herein, "equivalent weight" of the polyol compound is the number average molecular weight of the polyol compound divided by the average number of hydroxyl groups per molecule therein. The prepolymer prepared as described above then may be mixed with a chain-linkingly effective amount of the sucrose or sorbitol chain extender and with the catalyst to form the one-component polyurethane composition.

Alternatively, a secondary or tertiary aliphatic diisocyanate compound and a stoichiometric amount of polyol compound may be combined and partially reacted with one another at elevated temperature, to yield the prepolymer having an isocyanate content as described above, along with unreacted polyol compound in stoichiometric proportion to such isocyanate content of the prepolymer. The partially reacted mixture then suitably is placed under a vacuum below 50° C., preferably at about 25° C., in order to degas the mixture. After degassing, the catalyst, sucrose or sorbitol chain extender, and optional fillers as hereinafter described may be added, the mixture degassed again if desired, and the resulting polyurethane composition stored in a closed container to avoid exposure to atmospheric mixture.

The amount of sucrose or sorbitol chain extender to be used in the polyurethane composition of the present invention is based on the isocyanate (NCO) content of the composition. For sucrose, having three primary hydroxyl (—OH) groups and a molecular weight of 342, a stoichiometric amount, corresponding to an equivalent weight of 114, relative to the NCO content is most preferred, although in the broad practice of the invention an amount of from about 0.65 to about 1.35 times the stoichiometric amount is generally satisfactory. For sorbitol, with two primary hydroxyl groups and four secondary hydroxyl groups and a molecular weight of 182, the stoichiometric amount corresponding to a calculated equivalent weight of about 30. Nonetheless, it is unlikely that all six hydroxyl groups of sorbitol participate in the reaction. In practice, the number of reaction hydroxyl groups may be taken as three, yielding a calculated effective equivalent weight of about 60. Amounts of sorbitol of from about 0.65 to about 1.35 times the stoichiometric amount based on such effective equivalent weight are generally satisfactory.

Optionally, inert fillers, such as silica, talc, clay, fumed silica (e.g., "Cab-o-sil" N-70TS), or the like, may be added to the polyurethane composition to achieve the necessary or desired thickness and thixotropic characteristics.

The catalyst employed in the polyurethane composition of the present invention is selected from the group consisting of magnesium stearate, cadmium stearate, magnesium acetylacetonate, nickel acetylacetonate, and organic acid salts of 1,8-diazabicyclo[5.4.0]undec-7-ene, such as the oleic acid and 2-ethylhexanoic acid salts. The preferred catalysts are magnesium stearate and the 2-ethylhexanoic acid salt of 1,8-diazabicyclo[5.4.0]undec-7-ene.

The catalysts employed in the polyurethane composition of this invention have particular utility when the polyurethane composition is used as a one-component adhesive system inasmuch as these catalysts have little or no catalytic effect at room temperature but have a strong catalytic effect at elevated temperature.

The concentration of the catalyst used in the polyurethane composition will depend on the particular type of diisocyanate, prepolymer chain extender and polyol compound employed, the presence of additives, and the nature of the substrate(s) to be bonded. The concentration of magnesium or cadmium stearate employed generally is less than 1%, and preferably is from about 0.05% to about 0.2%, by weight, based on the weight of the polyurethane composition.

The concentration of magnesium or nickel acetylacetonate used in the polyurethane composition suitably may range from about 0.01% to about 4% by weight, and preferably from about 0.05% to about 2% by weight, based on the weight of the polyurethane composition.

The concentration of the oleic or 2-ethylhexanoic acid salt of 1,8-diazabicyclo[5.4.0]undec-7-ene which suitably may be employed in the polyurethane composition ranges from about 0.05% to about 2% by weight and preferably from about 0.1% to about 2% by weight, based on the weight of the polyurethane composition.

Some of the inert fillers, such as clay and fumed silica, may have a retarding effect on the cure rate. Therefore, in the presence of such fillers a higher concentration of the catalyst may be needed to maintain a fast cure rate.

Illustrative examples of suitable diisocyanates which may be used as precursors for the prepolymer employed in the present invention include the following:
$\alpha,\alpha,\alpha',\alpha'$-tetramethyl-1,3-xylylene diisocyanate,
$\alpha,\alpha,\alpha',\alpha'$-tetramethyl-1,4-xylylene diisocyanate,
methylenebis(4-cyclohexyl-isocyanate),
isophorone diisocyanate,
1,4-cyclohexylene diisocyanate,
1,8-p-menthane diisocyanate,
and the like.

The preferred diisocyanates are $\alpha,\alpha,\alpha',\alpha'$-tetramethyl-1,3-xylylene diisocyanate and methylenebis(4-cyclohexylisocyanate).

Polymeric hydroxyl-containing compounds, generally referred to in the art as "polyols," which may be used advantageously in the polyurethane compositions of the present invention include the following:
polypropylene glycol,
poly(ethylene adipate) (hydroxyl-terminated),
poly(butylene adipate) (hydroxyl-terminated),
polycaprolactone,
poly(tetramethylene ether glycol),
trifunctional polymers obtained by chain extending glycerol or trimethylolpropane with propylene oxide, and/or caprolactone units,
polyesters made from dibasic acids, diols and triols to provide polymers having more than two hydroxyl groups per molecule,
polyacrylates containing hydroxyethyl acrylate, hydroxypropyl acrylate, hydroxyethyl methacrylate, or hydroxypropyl methacrylate units, which thus have numerous pendant hydroxyl groups per polymer molecule, and the like.

The polyol compound desirably has an equivalent weight of from about 50 to about 2000, preferably from about 100 to about 1000.

In end-use adhesive applications, the time required to cure the polyurethane composition of the invention will depend on the temperature and shape of the substrate materials used, as well as the heat transfer media employed for imposing elevated temperature curing conditions on the adhesive film.

In the broad practice of the invention, the applied polyurethane composition suitably is cured by heating at 100°–200° C. for about 10–60 minutes.

In an especially preferred practice of the invention, wherein the polyurethane composition employs as the polyol compound a polyester or polyether oligomeric polyol, together with sorbitol and a suitable catalyst, the applied polyurethane composition is cured by heating at 120°–180° C. for about 2–20 minutes.

The invention is more fully illustrated by the following examples, which include particular features of the invention. However, the examples are not to be construed as limiting the invention in any way, it being understood that numerous variations are possible without departing from the spirit, or scope, of the invention. All parts and percentages in the examples are by weight, unless otherwise noted.

EXAMPLE 1

An isocyanate-terminated prepolymer was prepared by heating a mixture of poly(caprolactone)diol (520 grams of NIAX PCP-200; equivalent weight=260), previously dehydrated under vacuum, and methylene bis(4-cyclohexylisocyanate) (680 grams) under vacuum at 90° C. for 4 hours. The resulting product had an isocyanate content of 11.0%, calculated as NCO.

A paste was prepared by mixing the above prepolymer (6.03 grams), sorbitol (1.26 grams), magnesium stearate (0.0131 grams), and a calcium carbonate filler (0.72 gram of Homocel G-50). The resulting mixture was storage stable at room temperature for more than 14 weeks, and had a set-up time at 150° C. of 4 minutes.

The adhesive was applied to one end of each of two pieces of cold rolled steel (1 inch wide×5 inches long×0.06 inch thick) to obtain a gluelike thickness of 0.010 inch. The treated ends of the two pieces of steel were overlapped one inch, clamped together with two clamps, and cured in an oven at 150° C. for 15 minutes. The steel was then cooled at ambient temperatures for one day, the clamps were removed, and the lap-shear tensile strength was measured with an Instron tensile testing machine. The lap-shear tensile strength was 1500 psi.

EXAMPLE 2

An isocyanate-terminated prepolymer was prepared by reacting a mixture of NIAX PCP-200 (1000 grams), previously dehydrated under vacuum, with methylenebis(4-cyclohexylisocyanate) (1110 grams) at 90° C. for 2.5 hours. The resulting product was degassed under vacuum and heated at 90° C. for an additional 2.5 hours. The resulting product had an isocyanate content of 8.95%.

A paste was prepared by mixing 7.14 grams of the above prepolymer composition, 1.25 grams of sorbitol, and 0.044 gram of the oleic acid salt of 1,8-diazabicyclo[5.4.0]undec-7-ene, and degassing the mixture under vacuum. The resulting composition had a set-up time at 152° C. of 5 minutes, and was storage stable at room temperature for more than 9 weeks.

Following the procedure of Example 1, a lap-shear tensile strength of 2300 psi was obtained.

EXAMPLE 3

A paste was prepared by mixing 7.52 grams of the prepolymer composition of Example 2, 1.28 grams of sorbitol, and 0.08 gram of the 2-ethylhexanoic acid salt of 1,8-diazabicyclo[5.4.0]undec-7-ene, and degassing the mixture under vacuum. The resulting composition had a set-up time at 150° C. of 2.5 minutes, and was storage stable at room temperature for more than 8 weeks.

EXAMPLE 4

A paste was prepared by mixing 8.52 grams of the prepolymer composition of Example 2, 2.06 grams of sucrose (powdered cane sugar) and 0.0432 gram of the 2-ethylhexanoic acid salt of 1,8-diazabicyclo[5.4.0]undec-7-ene, and degassing the mixture under vacuum. The resulting composition had a set-up time at 152° C. of 3–4 minutes, and was storage stable at room temperature for more than 8 weeks.

Following the procedure of Example 1, a lap-shear tensile strength of 700–950 psi was obtained.

EXAMPLE 5

An isocyanate-terminated prepolymer was prepared by reacting a mixture of NIAX PCP-200 (52.0 grams) and a poly(caprolactone)triol (20.0 grams of NIAX PCP-201; equivalent weight=100), previously dehydrated under vacuum, with $\alpha,\alpha,\alpha',\alpha'$-tetramethyl-1,3-xylylene diisocyanate (100.0 grams) by heating at 100° C. for 7 hours, then at 90° C. for 26 hours. The resulting product had an isocyanate content of 10.2% calculated as NCO.

A paste was prepared by mixing 6.02 grams of the above prepolymer, 0.72 gram of sorbitol, and 0.3 grams of magnesium stearate. The resulting mixture was storage stable at room temperature for more than 4 months, and had a set-up time at 150° C. of 15 minutes.

What is claimed is:

1. A heat-curable one-component polyurethane composition, comprising: (a) a secondary or tertiary aliphatic diisocyanate prepolymer; (b) a polyol compound; (c) a chain extender selected from the group consisting of sucrose and sorbitol; and (d) a curingly effective amount of a catalyst selected from the group consisting of magnesium acetylacetonate, nickel acetylacetonate, magnesium stearate, cadmium stearate, and organic acid salts of 1,8-diazabicyclo[5.4.0]undec-7-ene.

2. A polyurethane composition according to claim 1 wherein the catalyst is magnesium stearate or cadmium stearate, at a concentration of from about 0.05% to about 1% by weight based on the weight of the composition.

3. A polyurethane adhesive composition according to claim 1 wherein the catalyst is magnesium acetylacetonate or nickel acetylacetone, at a concentration of from about 0.01% to about 4% by weight, based on the weight of the composition.

4. A polyurethane composition according to claim 1 wherein the catalyst is an oleic acid salt or a 2-ethylhexanoic acid salt of 1,8-diazabicyclo[5.4.0]undec-7-ene.

5. A polyurethane composition according to claim 1, wherein said catalyst is present at a concentration of from about 0.05% to about 2% by weight, based on the weight of the composition.

6. A polyurethane composition according to claim 1 wherein said secondary or tertiary aliphatic diisocyanate prepolymer is formed as a reaction product of a hydroxyl-terminated polyester or polyether and a secondary or tertiary aliphatic diisocyanate compound.

7. A polyurethane composition according to claim 6 wherein said polyester or polyether has an equivalent weight of from about 100 to about 2000.

8. A composition according to claim 6 wherein said secondary or tertiary aliphatic diisocyanate compound is selected from the group consisting of:
$\alpha,\alpha,\alpha',\alpha'$-tetramethyl-1,3-xylylene diisocyanate;
$\alpha,\alpha,\alpha',\alpha'$-tetramethyl-1,4-xylylene diisocyanate;
methylenebis(4-cyclohexylisocyanate);
1,4-cyclohexylene diisocyanate; and
1,8-p-menthane diisocyanate.

9. A composition according to claim 8 wherein said polyol compound (b) is selected from the group consisting of:
polypropylene glycol;
hydroxyl-terminated poly(ethylene adipate);

hydroxyl-terminated poly(butylene adipate):
polycaprolactone;
poly(tetramethylene ether glycol):
trifunctional polymers obtained by chain extending glycerol or trimethylol propane with propylene oxide, and/or caprolactone units;
polyesters made from dibasic acids, diols and triols to provide polymers having more than two hydroxyl groups per molecule; and
polyacrylates containing hydroxyethyl acrylate, hydroxypropyl acrylate, hydroxyethyl methacrylate, or hydroxypropyl methacrylate repeating units.

10. A process for bonding substrate workpieces with a polyurethane adhesive, comprising applying a wet film of said polyurethane composition of claim 1 interposed between and in contact with said substrate workpieces, and curing same at elevated temperature to form a solid polyurethane film adhesively bonding said substrate workpieces to one another.

11. A process according to claim 10 wherein the catalyst in said polyurethane composition is magnesium stearate or cadmium stearate, at a concentration of from about 0.05% to about 1% by weight based on the weight of the composition.

12. A process according to claim 10 wherein the catalyst in said polyurethane composition is magnesium acetylacetonate or nickel acetylacetonate, at a concentration of from about 0.01% to about 4% by weight, based on the weight of the composition.

13. A process according to claim 10 wherein the catalyst in said polyurethane composition is an oleic acid salt or a 2-ethylhexanoic acid salt of 1,8-diazabicyclo[5.4.0]undec-7-ene.

14. A process according to claim 10 wherein said secondary or tertiary aliphatic diisocyanate prepolymer in said polyurethane composition is formed as a reaction product of a hydroxyl-terminated polyester or polyether and a secondary or tertiary diisocyanate compound.

15. A process according to claim 14 wherein said polyester or polyether has an equivalent weight of from about 100 to about 2000.

16. A process according to claim 14 wherein said secondary or tertiary aliphatic diisocyanate compound in said polyurethane composition is selected from the group consisting of:
α,α,α',α'-tetramethyl-1,3-xylylene diisocyanate,
α,α,α',α'-tetramethyl-1,4-xylylene diisocyanate;
methylenebis(4-cyclohexyl-isocyanate);
isophorone diisocyanate;
1,4-cyclohexylene diisocyanate; and
1,8-p-menthane diisocyanate.

17. A process according to claim 10, wherein said polyol compound in said polyurethane composition is selected from the group consisting of:
polypropylene glycol;
hydroxyl-terminated poly(ethylene adipate):
hydroxyl-terminated poly(butylene adipate);
polycaprolactone;
poly(tetramethylene ether glycol);
trifunctional polymers obtained by chain extending glycerol or trimethylolpropane with propylene oxide, and/or caprolactone units;
polyesters made from dibasic acids, diols and triols to provide polymers having more than two hydroxyl groups per molecule; and
polyacrylates containing hydroxyethyl acrylate or hydroxyethyl methacrylate repeating units.

18. An article comprising an assembly of substrate workpieces adhesively bonded to one another by a cured film of the heat-curable polyurethane composition of claim 1.

* * * * *